United States Patent Office 2,772,928
Patented Dec. 4, 1956

2,772,928

BEARINGS OR BUSHINGS

Hans Traugott Schulz, Nurnberg, and Friedrich Rittmann, Ruckersdorf, Mittelfranken, Germany, assignors to C. Conradty, Nurnberg, Germany Application February 25, 1953, Serial No. 338,814

Claims priority, application Germany March 21, 1952

1 Claim. (Cl. 308—36.1)

This invention relates to bearings or bushes for shafts, rods or the like.

As is known carbon is very suitable as the material for a slide or slip bearing owing to its self-lubricating property, its capacity to conduct heat and its reduced mechanical wear. There are numerous cases in practice, especially in the glass, ceramic and metallurgical industries, where cylindrical bearings made of carbon have been found to have a considerably longer life than metallic slide bearings.

An object of this invention is to provide improved carbon bearings constructed to have a packing or sealing function in addition to their supporting function.

A self-packing bearing of carbon according to the present invention having packing and self-lubricating properties is obtained by locating packing elements in the running surface of the carbon bearing and by a subsequently applied impregnating or bonding means combining the elements with the bearing to produce a mechanically rigid unitary structure. The bonding means employed is such that it promotes and aids the packing properties of the bearing body.

Felt, hemp and rubber fabric or equivalent plastic, deformable packing materials of circular, square or triangular profile may be employed as the packing means and are selected according to particular uses. Said packing elements prior to impregnation are preferably so secured by being inserted, pressed, cemented or injected into annular, helical or radially directed grooves in the body of the carbon bearing that parts of the packing rings project radially inwards from the bore of the carbon bearing and have, relatively to the diameter of the bore, a waste or loss which may be up to three times the amount of the shaft play provided.

The number of insert packing elements employed is variable and one, two or more may be provided. The number and also the disposition of the packing elements within the body of the bearing depend largely on particular operating requirements.

Figure 1:
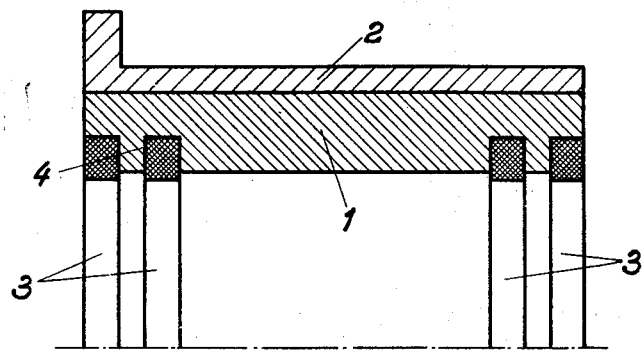
Figure 2:
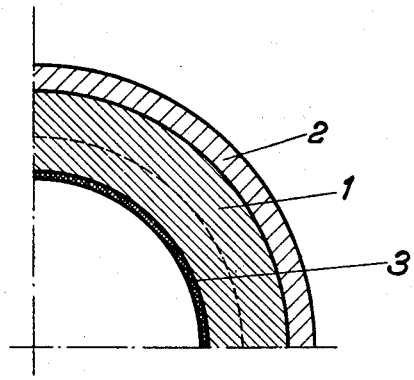

In the accompanying drawings, Figs. 1 and 2 are respectively a longitudinal section and a cross section of part of a bearing according to one form of the invention.

The drawings illustrate a bearing or bush 1 proper composed of carbon, said bearing being pressed into a steel housing 2 in order to enhance mechanical rigidity. This metallic housing is generally only necessary in cases where excessive loads are transmitted. Usually, the bearing may be made without a metal housing sleeve. The packing elements in the example are in the form of felt rings 3 pressed into circular grooves 4 formed in the bore of the bearing body 1. The packing elements are united with the bearing body to form a mechanically rigid structure by means of a suitable impregnating and bonding means such as, for example, hard wax.

We claim:

A bearing which is self-contained, self-lubricating and self-packing comprising a cylindrical body of carbon having at each end at least one groove arranged circumferentially in the internal surface of the body and a ring of felt provided in each of said grooves so that said rings are deformable to form secure packings, said rings being impregnated with hard wax so that each felt ring will be bonded to adjacent parts of the respective groove to thereby form a self-contained bearing structure, said rings projecting a slight distance inwardly beyond the internal peripheral surface of the body of carbon.

References Cited in the file of this patent

UNITED STATES PATENTS

| 537,172 | Albrecht | Apr. 9, 1895 |
| 1,052,638 | Altmann et al. | Feb. 11, 1913 |
| 1,458,943 | Kinney | June 19, 1923 |
| 2,039,386 | Borst | May 5, 1936 |
| 2,086,787 | Whiteley | July 13, 1937 |
| 2,177,040 | Huhn | Oct. 24, 1939 |
| 2,600,079 | Scully | June 10, 1952 |
| 2,621,946 | Jendrassik | Dec. 16, 1952 |